US010690977B1

(12) United States Patent
Pan

(10) Patent No.: US 10,690,977 B1
(45) Date of Patent: Jun. 23, 2020

(54) DISPLAY PANEL

(71) Applicant: Himax Display, Inc., Tainan (TW)

(72) Inventor: Po-Hung Pan, Tainan (TW)

(73) Assignee: Himax Display, Inc., Tainan (TW)

( * ) Notice: Subject to any disclaimer, the term of this patent is extended or adjusted under 35 U.S.C. 154(b) by 0 days.

(21) Appl. No.: 16/391,329

(22) Filed: Apr. 23, 2019

(51) Int. Cl.
*G02F 1/1339* (2006.01)
*G02F 1/1362* (2006.01)

(52) U.S. Cl.
CPC ...... *G02F 1/136209* (2013.01); *G02F 1/1339* (2013.01); *G02F 2201/38* (2013.01)

(58) Field of Classification Search
CPC ........... G02F 2201/38; G02F 1/133502; G02F 1/1339; G02F 1/136209; G02F 2001/133311
See application file for complete search history.

(56) References Cited

U.S. PATENT DOCUMENTS

2016/0216552 A1   7/2016   Jin

FOREIGN PATENT DOCUMENTS

| JP | 2012150418 | * | 8/2012 | .................... 349/113 |
| TW | 200617437 | | 6/2006 | |
| TW | 201908826 | | 3/2019 | |

OTHER PUBLICATIONS

"Office Action of Taiwan Counterpart Application", dated Feb. 18, 2020, p. 1-p. 3.

* cited by examiner

*Primary Examiner* — James A Dudek
(74) *Attorney, Agent, or Firm* — JCIPRNET

(57) ABSTRACT

A display panel includes a top substrate having a top surface, a plurality of protrusions disposed on the top surface of the top substrate, an antireflective layer disposed on the top surface of the top substrate, a light shielding layer, a bottom substrate positioned at a side of the top substrate opposite to the top surface of the top substrate, and a display medium layer disposed between the top substrate and the bottom substrate. A first projection of the light shielding layer onto the top substrate is completely located within a second projection of the antireflective layer onto the top substrate, and a bottom surface of the light shielding layer is nonplanar to cover the plurality of protrusions.

20 Claims, 16 Drawing Sheets

DISPLAY PANEL

BACKGROUND

Technical Field

The present invention generally relates to an electronic device, in particular, to a display panel.

Description of Related Art

Although black borders of a screen are narrower in terms of product trends, they still play an indispensable role in preventing unwanted light leakage and tracing electrical circuits. The black borders can shield a sealant or an adhesive behind them as well. Therefore, a display panel is typically disposed with a patterned light shielding layer such as a black matrix layer to serve as the black border. The patterned light shielding layer has a frame-like pattern which demarcates and defines a display region.

In a liquid crystal display panel, a display medium layer including liquid crystal material is disposed between a top substrate and a bottom substrate while the top substrate and the bottom substrate are glued together with the sealant or adhesive. The sealant or adhesive is generally made of light curable materials in a liquid crystal display panel. Therefore, a transparent top substrate that allows light to penetrate through it is necessary to cure the light curable sealant or adhesive. In some display panel, a light shielding layer is further formed on the outer surface of the transparent top substrate to shield the cured sealant or adhesive and/or block the possible leaked light at the periphery. However, the light shielding layer disposed on the outer surface of the top substrate is likely to be peeled off or damaged.

SUMMARY

Accordingly, the present invention is directed to a display panel in which adhesion between the light shielding layer and a top substrate of the display panel is enhanced.

According to an embodiment, a display panel includes a top substrate having a top surface, a plurality of protrusions disposed on the top surface of the top substrate, an antireflective layer disposed on the top surface of the top substrate, a light shielding layer, a bottom substrate positioned at a side of the top substrate opposite to the top surface of the top substrate, and a display medium layer disposed between the top substrate and the bottom substrate. A first projection of the light shielding layer onto the top substrate is completely located within a second projection of the antireflective layer onto the top substrate, and a bottom surface of the light shielding layer is nonplanar to cover the plurality of protrusions.

The display panel according to the embodiments of the disclosure is disposed with the protrusions in the first region where the light shielding layer is formed. The protrusions provide a rough surface to securely bond the light shielding layer and its underlying layer together. Accordingly, the adhesion between the light shielding layer and a top substrate of the display panel is enhanced. This ensures light shielding efficiency of the light shielding layer, thereby improving the quality of the display panel.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

Each of FIGS. 3 to 15 schematically illustrates a cross section of a display panel according to an embodiment of the present disclosure.

DESCRIPTION OF THE EMBODIMENTS

Figure 1A:
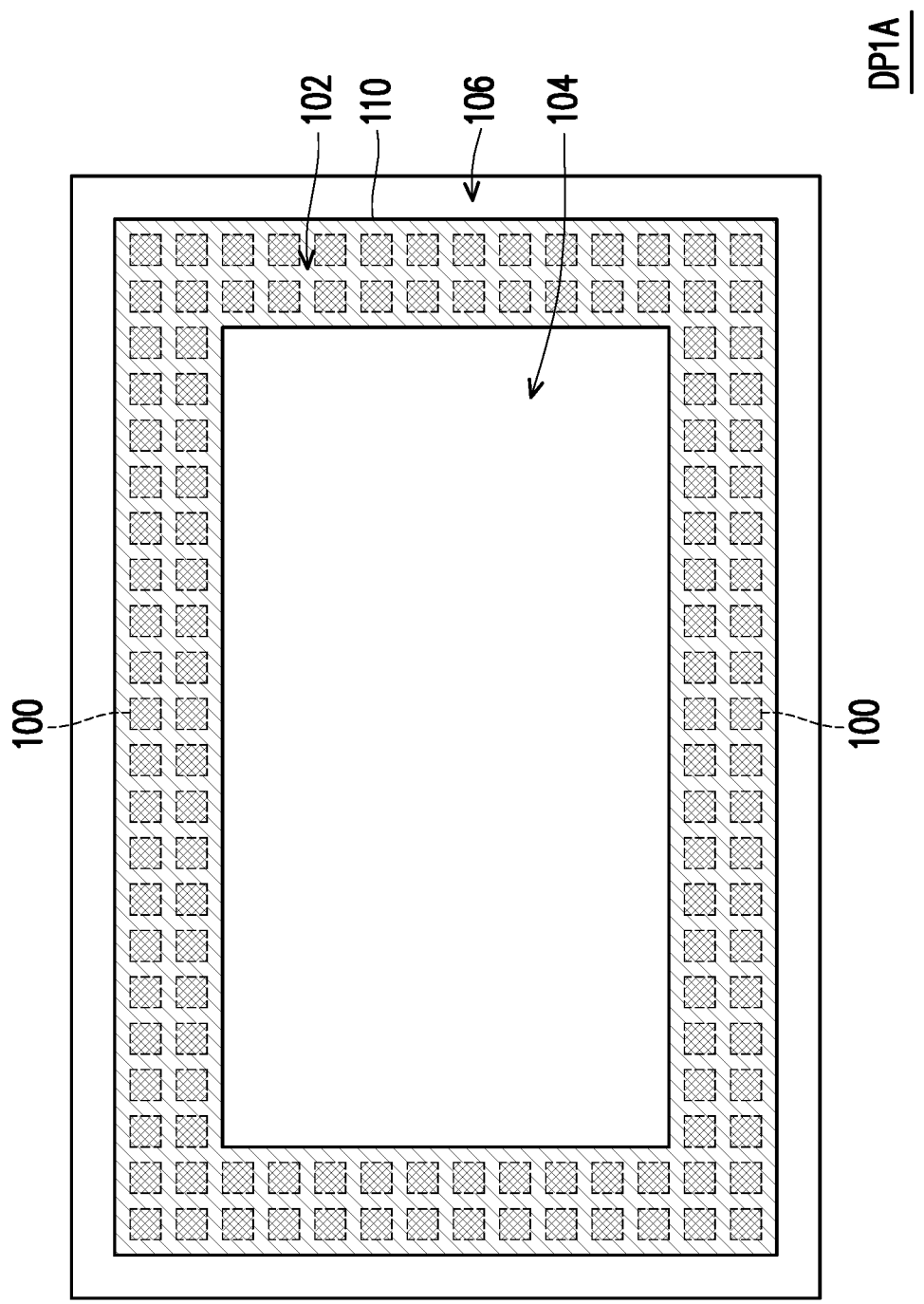
FIG. 1A schematically illustrates a top view of a display panel in accordance with an embodiment of the present disclosure.

FIG. 1A schematically illustrates a top view of a display panel in accordance with an embodiment of the present disclosure. Referring to FIG. 1A, the display panel DP1A has a first region 102, a second region 104 and a third region 106. As viewed from above, the first region 102 has a frame-like pattern and surrounds the second region 104. The third region 106 extends from the edge of the display panel DP1A and the first region 102, and the third region 106 may also have a frame-like pattern and surrounds the second region 104. In some alternative embodiments, the third region 106 may be omitted and the first region 102 may extend to align the edge of the display panel DP1A. The display panel DP1A includes a light shielding layer 110 that is located in the first region 102. In the present embodiment, the light shielding layer 110 also has a frame-like pattern. The light shielding layer 110 blocks out light to prevent unwanted light leakage or to shield underlying layers or structures so that the underlying layers or structures is hidden or invisible from the top view. The first region 102 therefore serves as the non-display region. In some embodiments, the first region 102 may be known as a region where the light shielding layer exists. The light shielding layer 110 is absent in the second region 104. Besides, images are rendered and presented in the second region 104 so that the second region 104 serves as the display region. In alternative embodiments, the pattern of the light shielding layer 110 may vary according to different design requirements.

In an embodiment, the light shielding layer 110 is formed in the first region 102 on a top substrate of the display panel DP1A via a wet process such as an ink-jet printing process, a screen-printing process, an APR printing (flexographic printing) process or the like. To provide greater adhesion between the light shielding layer 110 and the top substrate, a plurality of protrusions 100 is disposed in the first region 102 and the light shielding layer 110 covers the protrusions 100. In FIG. 1A, the protrusions 100 underneath the light shielding layer 110 is shown by dashed lines to add extra emphasis on the component "protrusions 100", while other components of the display panel DP1A are partially or completely omitted in FIG. 1A to present the figure clearly.

Figure 1B:
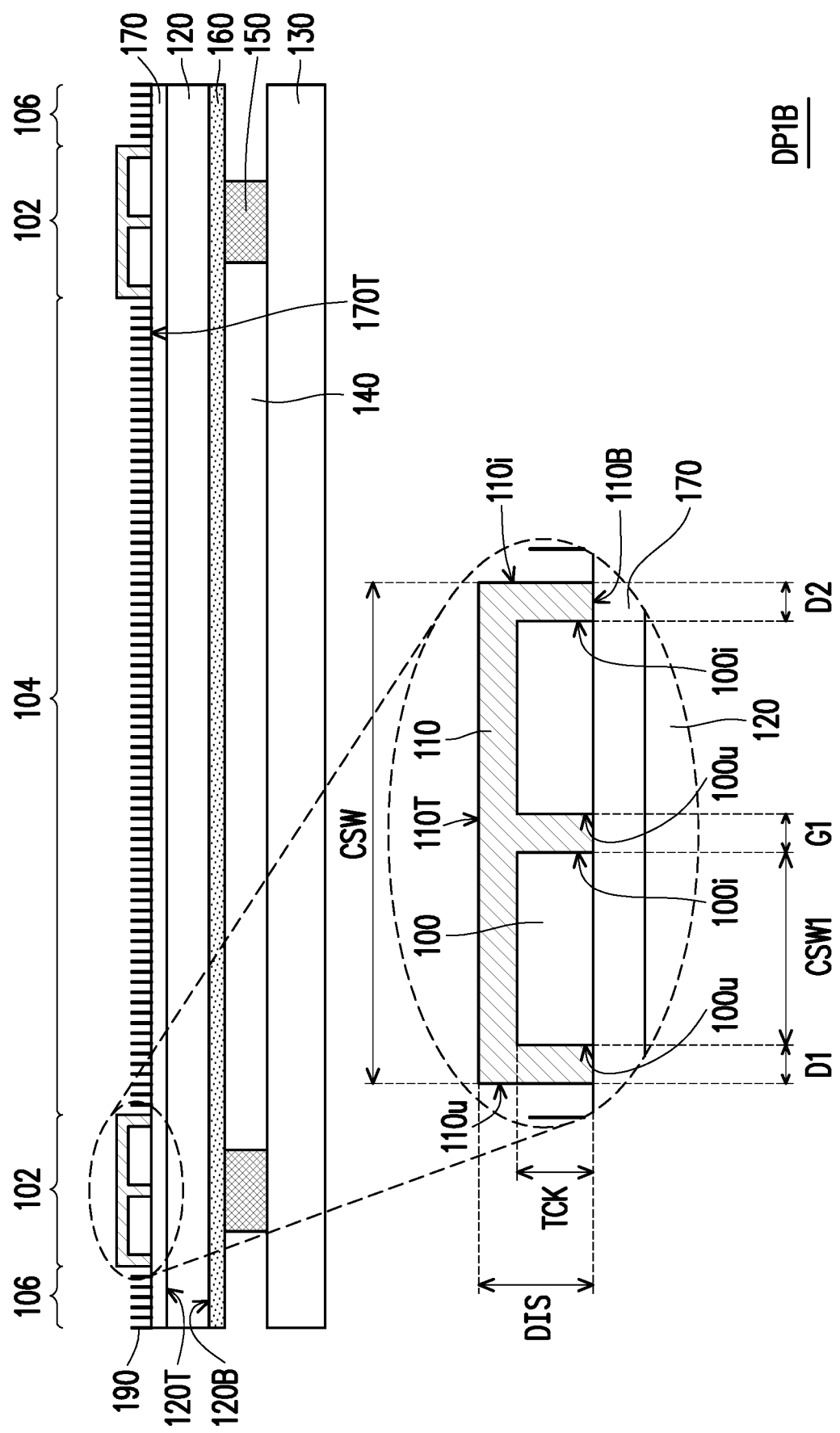
FIG. 1B schematically illustrates a cross sectional view of a display panel, aligned with top view of the display panel of FIG. 1A, in accordance with an embodiment of the present disclosure.

As show in FIG. 1B, which schematically illustrates a cross section of a display panel according to an embodiment of the present disclosure, a display panel DP1B includes a plurality of protrusions 100, a light shielding layer 110, a top substrate 120, a bottom substrate 130, a display medium layer 140, a sealant 150, an electrode layer 160, an antireflective layer 170, a hydrophobic layer 190, top alignment layer (not shown) disposed on the electrode layer 160, and bottom alignment layer (not shown) disposed on the bottom substrate 130. The display medium layer 140 is sandwiched between the top and bottom alignment layers. The light shielding layer 110 is disposed on a top surface 170T of the antireflective layer 170 of FIG. 1B, in which the pattern of the light shielding layer 110 as viewed from above can be substantially the same or similar to that of the light shielding layer 110 shown in FIG. 1A. Specifically, the light shielding layer 110 has a frame-like pattern. The display panel DP1B has a first region 102 and a second region 104, which is similar to the first region 102 and the second region 104 depicted in FIG. 1A. In other words, the top view of the display panel DP1B in FIG. 1B is similar to the display panel DP1A in FIG. 1A.

The light shielding layer 110 surrounds at the periphery of the antireflective layer 170. The antireflective layer 170 is disposed in both the first region 102 and the second region 104 on the top surface 120T of the top substrate 120. The antireflective layer 170 is continuously distributed at least underneath the light shielding layer 110 without a slot nor an opening. In such a situation, a first projection of the light shielding layer 110 onto the top substrate 120 is completely located within a second projection of the antireflective layer 170 onto the top substrate 120. The first projection overlaps the second projection, and an overlapping area of the first projection and the second projection is equal to an area of the first projection.

The antireflective layer 170 is disposed on a top surface 120T of the top substrate 120 facing away from the sealant 150. The top substrate 120 and the bottom substrate 130 are arranged opposite to each other and the sealant 150 is disposed between the top substrate 120 and the bottom substrate 130. Namely, the bottom substrate 130 is positioned at a side of the top substrate 120 opposite to the top surface 120T of the top substrate 120, and the top substrate 120 and the bottom substrate 130 are assembled with the sealant 150. The display medium layer 140 is disposed between the top substrate 120 and the bottom substrate 130, and is surrounded by the sealant 150. The material of the top substrate 120 may be glass, quartz, or the like. The material of the display medium layer 140 may be a liquid crystal material so that the top substrate 120, the bottom substrate 130, the display medium layer 140 and the sealant 150 may serve as a liquid crystal cell. The electrode layer 160 is disposed on a bottom surface 120B of the top substrate 120 that faces the display medium layer 140. The material of the electrode layer 160 may be a transparent conductive material, such as indium tin oxide (ITO).

Although the bottom substrate 130 is presented as a plate-like structure in FIG. 1B, the bottom substrate 130 may be a transistor array substrate, which includes a support substrate and a transistor array. The support substrate may be, for example but not limited thereto, a glass plate, or a silicon backplane; the transistor array may be, for example but not limited thereto, a thin film transistor array or a CMOS (Complementary Metal-Oxide Semiconductor) device array. The transistor array (not shown) and the electrode layer 160 may be used to provide electric field to drive and realign the display medium layer 140. In some embodiments, the display panel DP1B may be a Thin Film Transistor Liquid Crystal Display (TFT-LCD) panel or an LCoS (Liquid Crystal on Silicon) display panel. In some alternative embodiments, the electrode layer 160 may be omitted based on the driving circuit design of the display panel DP1B.

To enhance adhesion between the light shielding layer 110 and its underlying layer, the protrusions 100 are disposed on the top surface 170T of the antireflective layer 170 and located in the first region 102—as a result, the top surface 170T of the antireflective layer 170 is covered with lumps (i.e., the protrusions 100). A distance between the bottom surface 120B of the top substrate 120 and the top surface 170T of the antireflective layer 170 is equal to a distance between the bottom surface 120B of the top substrate 120 and a bottom surface of each of the protrusions 100. Namely, the top surface 170T of the antireflective layer 170 and a bottom surface of each of the protrusions 100 are coplanar. Although the number of the protrusions 100 on the left-hand side of the antireflective layer 170 shown in FIG. 1B is two, but those skilled in the art might make modifications accordingly to dispose more than two protrusions 100 on the left-hand side of the antireflective layer 170. The light shielding layer 110 is disposed on the protrusions 100 and directly in contact with the protrusions 100. The light shielding layer 110 covers the protrusions 100 and a portion of the top surface 170T of the antireflective layer 170. Since the protrusions 100 are embedded in and covered by of the light shielding layer 110, the bottom surface 110B of the light shielding layer 110 is also stepped and has different levels. Furthermore, the light shielding layer 110 fills each gap between two adjacent protrusions 100. That is to say, the bottom surface 110B of the light shielding layer 110 is nonplanar to encase the protrusions 100.

Accordingly, the light shielding layer 110, in the cross section as shown in FIG. 1B, may have a comb-like pattern. The protrusions 100 located or sandwiched between the light shielding layer 110 and the antireflective layer 170 are patterns formed in the comb gaps of the comb-like pattern of the light shielding layer 110.

In some embodiments, each of the protrusions 100 is a stacked multi-layer thin film. Specifically, the materials of the protrusions 100 may be inorganic or organic. The inorganic material may be oxides, metal oxides, metals, nitrides, fluorides or hydrides. Oxides materials, which may be deposited by thermal evaporation, may be silicon oxide, titanium oxide, indium tin oxide, niobium oxide or a combination thereof. The organic material may be parylene (Poly-p-xylylene). In some embodiments, materials of the protrusions 100 may be identical to a material of the antireflective layer 170. In some embodiments, the protrusions 100 and the antireflective layer 170 are integrally formed; hence, the protrusions 100 may be a one-piece or unitary part of the antireflective layer 170.

In FIG. 1A, the protrusions 100 are identical in size and shape; the pitch of the protrusions 100 is fixed. However, the present disclosure is not limited thereto. According to different design requirements, the distance between successive correspondence or adjacent protrusions 100 may vary, and each of the protrusions 100 may have distinct size or shape. In some embodiments, a cross-section width CSW1 of one protrusion 100 is greater than 10% of a cross-section width CSW of light shielding layer 110 and less than 50% of the cross-section width CSW of the light shielding layer 110 when the thickness is measured along a straight cross-section line extending from an edge of the light shielding layer 110 adjacent to the second region 104 to an edge of the light shielding layer 110 adjacent to the third region 106. Alternatively, the cross-section width CSW1 of one protrusion 100 is the width from a (first inner) edge 100i to a (first outer) edge 100u; similarly, the cross-section width CSW of the light shielding layer 110 is the width from an inner edge 110i to an outer edge 110u. The inner edge 110i of the light shielding layer 110 is close to the center of the display panel DP1B, while the outer edge 110u of the light shielding layer 110 is further from the center of the display panel DP1B. If the light shielding layer 110 or the protrusion 100 is of curved surface, the cross-section width CSW or the cross-section width CSW1 is measured from an outermost point at one side to another outermost point at the opposite side. In some embodiments, a thickness TCK of one protrusion 100 (or the distance between a top point of the protrusion 100 and a bottom point of the protrusion 100) is less than 50% of the distance DIS between a top surface 110T of the light shielding layer 110 and the top surface 170T of the antireflective layer 170.

The outer edge 110u of the light shielding layer 110 and a (first outer) edge 100u of the (left) protrusion 100 closest to the outer edge 110u are spaced apart by a first distance D1; the inner edge 110i of the light shielding layer 110 and a (second inner) edge 100i of the (right) protrusion 100 closest to the inner edge 110i are spaced apart by a second distance D2. The (inner) edge 100i of the (either right or left) protrusion 100 is close to the center of the display panel DP1B, while the (outer) edge 100u of the (either right or left) protrusion 100 is further from the center of the display panel DP1B. The first distance D1 and the second distance D2 may be the same or different. The first distance D1 and the second distance D2 are both greater than zero so that the protrusions 100 are completely encased between the light shielding layer 110 and the underlying layer (the antireflective layer 170). In the embodiment, there is a gap G1 between two adjacent protrusions 100; in an alternative embodiment, two adjacent protrusions may be closely disposed without gaps.

In some embodiments, the protrusions 100 provide a roughened surface in the first region 102 and the light shielding layer 110 is in contact with the roughened surface so that adhesion between the light shielding layer 110 and its underlying layer (i.e., the antireflective layer 170) may be enhanced. In some embodiments, a surface roughness of the structure of the antireflective layer 170 with the protrusions 100 in the first region 102 may be larger than 1 nm which is obviously greater than the surface roughness of the antireflective layer 170 in the second region 104. Accordingly, the light shielding layer 110 disposed on the protrusions 100 is hardly being damaged or peeled off, thereby ensuring the light shielding effect of the light shielding layer 110 and improving the quality of the display panel DP1B.

Moreover, a hydrophobic layer 190 may be disposed on the top surface 170T of the antireflective layer 170. In the embodiment, a part of the hydrophobic layer 190 is distributed in the second region 104 and another part of the hydrophobic layer 190 is located in the third region 106 between the edge of the display panel DP1B and the first region 102. In such a case, the hydrophobic layer 190 may be absent in the first region 102 and of the boundary between the light shielding layer 110 and the hydrophobic layer 190 demarks the first region 102. The hydrophobic layer 190 increases the hydrophobicity of an outer top surface of the display panel DP1B at the second region 104 and the third region 106 when compared to the that at the first region 102.

The fabrication process of the display panel DP1A or DP1B may include the following steps. First, the electrode layer 160 is disposed on the bottom surface 120B of the top substrate 120. In some embodiments, the antireflective layer 170 and the protrusions 100 are subsequently disposed on the top surface 120T of the top substrate 120. To fabricate the protrusions 100, a blanket layer is formed on the antireflective layer 170 and then patterned to form the protrusions 100 by, for example, dry or wet etching. Alternatively, the protrusions 100 may be formed by depositing a material of the protrusions 100 through a shadow mask, such that the structure of the protrusions 100 shown in FIG. 1B may be obtained after the deposition without a patterning step. Thereafter, the top substrate 120 and the bottom substrate 130 are assembled via the sealant 150 keeping a distance between the top substrate 120 and the bottom substrate 130 while the display medium layer 140 fills the gap between the top substrate 120 and the bottom substrate 130. The sealant 150 may form a frame-like pattern surrounding the display medium layer 140. The sealant 150 may be made of a light curable material so that a light curing step may be performed after joining the top substrate 120 and the bottom substrate 130 via the sealant 150.

Subsequently, the hydrophobic layer 190 may be formed on the top surface 170T of the antireflective layer 170 to increase the hydrophobicity of the outer top surface of the display panel DP1B at the second region 104 and the third region 106. The formation of the hydrophobic layer 190 on the top surface 170T of the antireflective layer 170 may involve a surface treatment or modification process, such as a silane surface treatment process, over the outer top surface of the display panel DP1B. A patterning process may then be performed by shielding the second region 104 and (optionally) the third region 106 via a mask. An electromagnetic wave is applied on the remaining exposed part of the outer top surface of the display panel DP1B. In other words, the first region 102 is exposed. The electromagnetic wave may be UV (ultraviolet) light or EUV (extreme ultraviolet) light of sufficient energy to decompose the hydrophobic layer 190. After the irradiation process, the hydrophobic layer 190 in the shielded region (i.e., the second region 104 and the third region 106) remains and the hydrophobic material of the hydrophobic layer 190 in the exposed region (i.e., the first region 102) is decomposed.

Afterwards, a wet process such as an inkjet printing process may be performed to form the light shielding layer 110 in the first region 102 to cover the protrusions 100 as shown in FIG. 1B, where an ink material is dropped on the protrusions 100 and the top substrate 120 in the first region 102. With the roughened surface provided by the protrusions 100 and the distribution and the hydrophobicity of the hydrophobic layer 190, the ink material may spread evenly over the bumpy surface in the first region 102 without spreading to the second region 104. The ink material, as a result, is firmly confined to the antireflective layer 170 at the first region 102. In addition, the contact angle of the ink material on the antireflective layer 170 at the boundary between the first region 102 and the second region 104 may be large, for example, larger than 70 degrees. Thereafter, a curing process can be performed to solidify the ink material to form the light shielding layer 110 of a sharp and linear edge. In particular, the pattern of the light shielding layer 110 may have straight-line edges.

Figure 2:
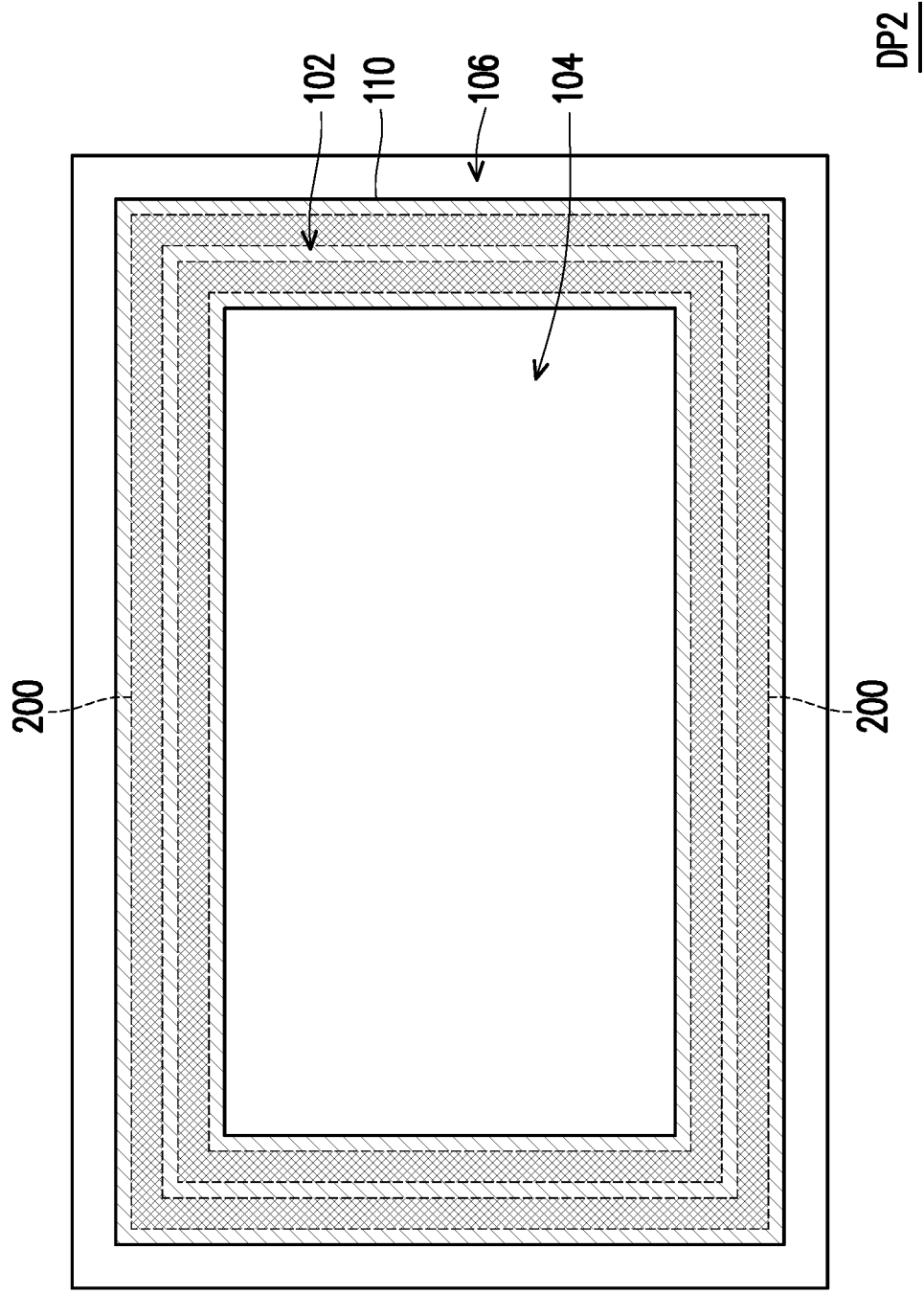
FIG. 2 schematically illustrates a top view of a display panel in accordance with an embodiment of the present disclosure.

In FIG. 1A, a shape of a projection of one of the protrusions 100 onto the top substrate 120 is rectangle. Nevertheless, in an alternative embodiment, a projection of one protrusion onto the top substrate 120 may be circular, elliptical, triangular, polygonal, U-shaped, loop-shaped or closed in shape. In an alternative embodiment, a projection of the protrusion onto the top substrate 120 may have no particular shape. For example, FIG. 2 is a schematic diagram illustrating a top view of a display panel according to an embodiment of the invention. To clarify the modifications between embodiments about to be mentioned and the aforementioned embodiments, the same reference numerals and notations denote the same components in the following description, and similar parts are not detailed redundantly. A display panel DP2 shown in FIG. 2 is roughly similar to the display panel DP1A shown in FIG. 1A, while shapes or configurations of protrusions 200 shown in FIG. 2 are distinct from those of the protrusions 100 shown in FIG. 1A. As shown in FIG. 2, each of the protrusions 200 shown in FIG. 2 has the shape of a loop, ring or frame. The loops (i.e., the protrusions 200) may be concentric, and be arranged to have a spacing between individual loops.

FIGS. 3 to 9 in the following paragraphs respectively illustrate cross sections of display panels according to embodiments. Each of the embodiments illustrated in FIGS. 3 to 9 share certain features with the embodiment illustrated in FIG. 1B. Only differences of each embodiment from the embodiment illustrated in FIG. 1B are henceforth described. To clarify the modifications between embodiments about to be mentioned and the aforementioned embodiments, the same reference numerals and notations denote the same components in the following description, and similar parts are not detailed redundantly.

Figure 3:
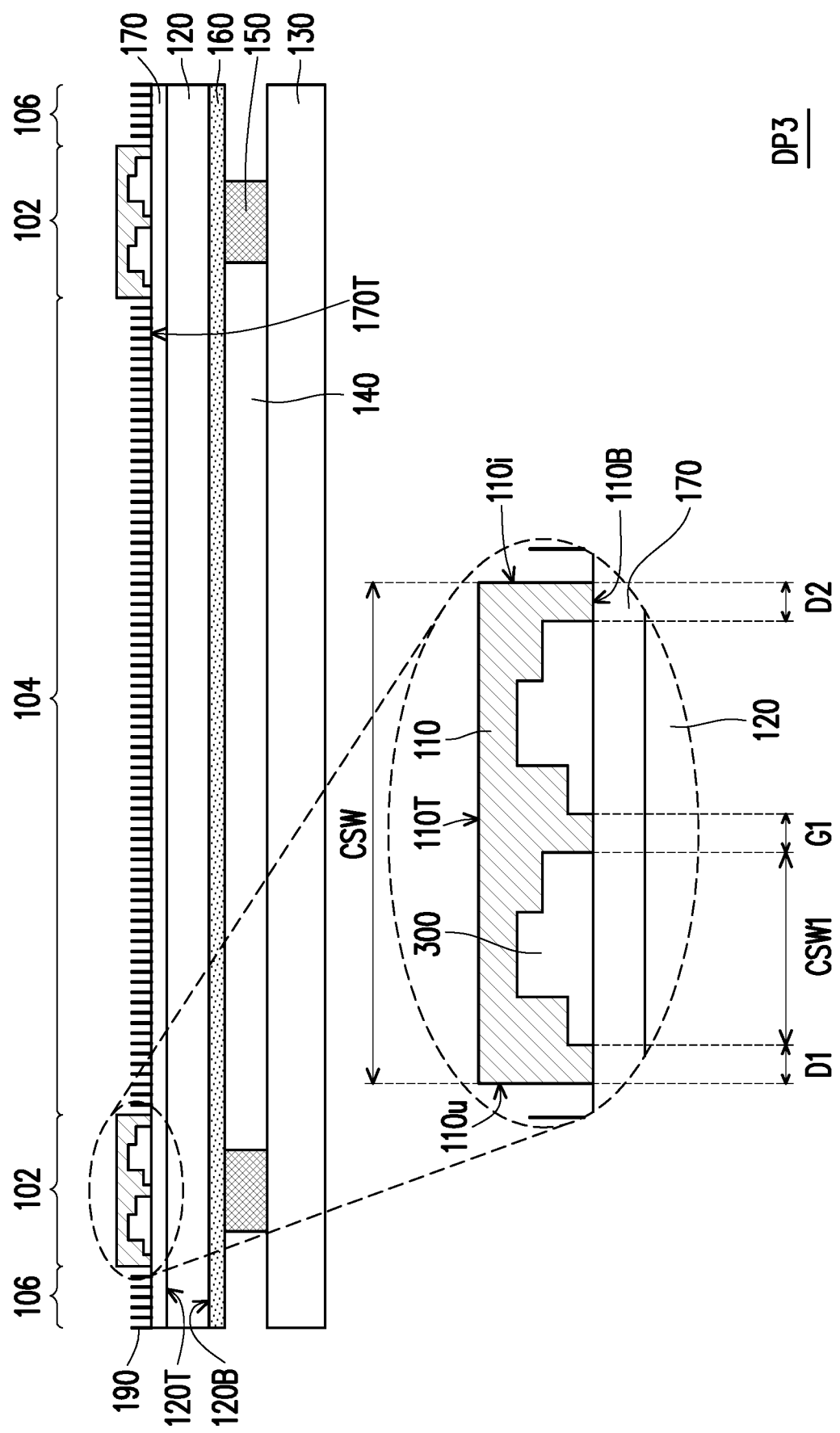

In FIG. 1B, a shape of a cross section of one of the protrusions 100 is rectangle. Nevertheless, in an alternative embodiment, one of the protrusions may be multi-steps podium-shaped. For example, FIG. 3 is a schematic diagram illustrating a top view of a display panel according to an embodiment of the invention. As shown in FIG. 3, in the display panel DP3, a top surface of at least one protrusion 300 is uneven and nonplanar. More specifically, at least one of the protrusions 300 are stepped and has different levels, which makes the protrusion 100 multi-steps podium-shaped. In some embodiments, since the protrusions 300 are embedded in and covered by of the light shielding layer 110, the bottom surface 110B of the light shielding layer 110 is also stepped and has different levels. Namely, the bottom surface 110B of the light shielding layer 110 extends along a top surface and a side surface of the protrusions 300. In some embodiments, the light shielding layer 110 fills each gap between two adjacent protrusions 300. That is to say, the bottom surface 110B of the light shielding layer 110 is nonplanar to encase the protrusions 300, such that the contact area of the light shielding layer 110 contacting the underlying layer and/or objects is increased.

Figure 4:
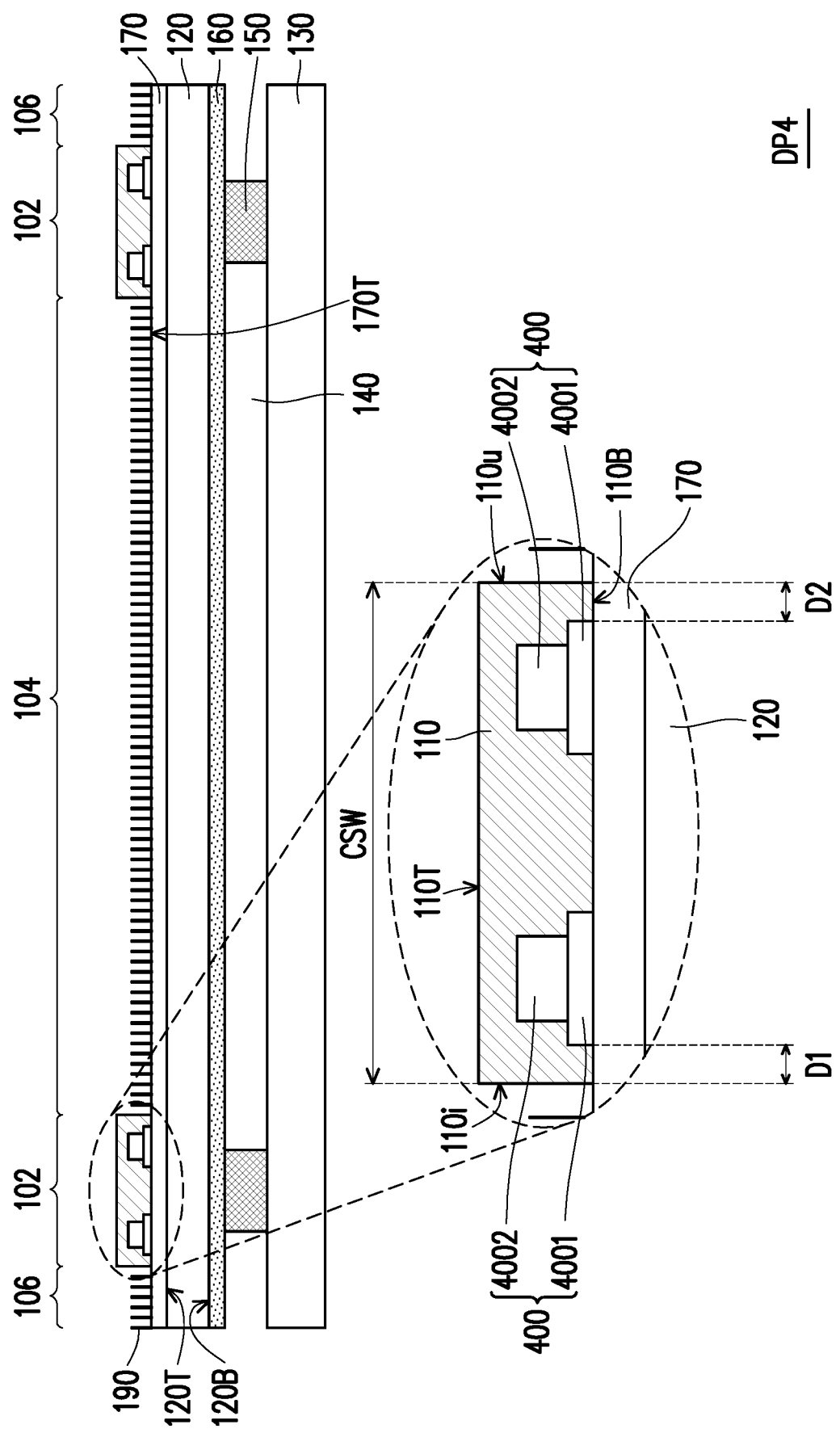

In some embodiments, at least one protrusion may be regionalized or divided into different portions. FIG. 4 is a schematic diagram illustrating a cross section of a display panel according to an embodiment of the invention. As shown in FIG. 4, in the display panel DP4, at least one of protrusions 400 includes a first portion 4001 and a second portion 4002. The second portion 4002 is disposed on the first portion 4001. The second portion 4002 in contact with the first portion 4001 is disposed on a top surface of the first portion 4001 and partially exposes the first portion 4001. As viewed from above, a contour of the first portion 4001 may be different from that of the second portion 4002. In other words, a projection of the first portion 4001 onto the top substrate 120 may be larger than a projection of the second portion 4002 onto the top substrate 120. In some embodiments, a material of the second portion 4002 is different from a material of the first portion 4001; the first portion 4001 and the second portion 4002 are made from similar or identical material in other embodiments.

Figure 5:
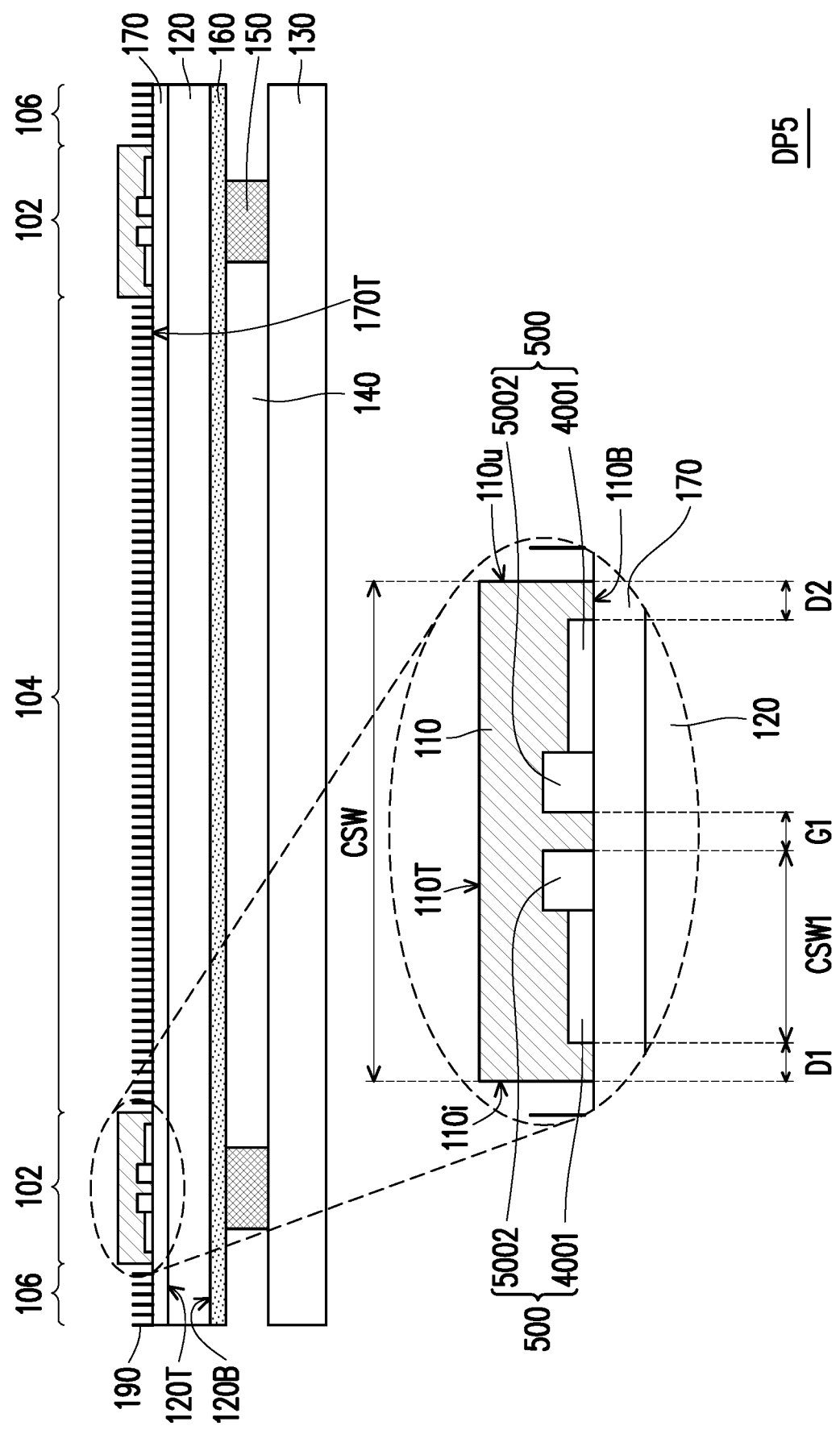

The configuration of the first portion 4001 and the second portion 4002 shown in FIG. 4 may be modified. FIG. 5 is a schematic diagram illustrating a cross section of a display panel according to an embodiment of the invention. As shown in FIG. 5, in the display panel DP5, at least one of protrusions 500 includes the first portion 4001 and a second portion 5002. The second portion 5002 is disposed adjacent to an edge of the first portion 4001 and in contact with the first portion 4001. Namely, the second portion 5002 is disposed beside the first portion 4001. The first portion 4001 and the second portion 5002 may be of unequal size. For example, the second portion 5002 is thicker than the first portion 4001. In such a situation, a top surface of the first portion 4001 and a top surface of the second portion 5002 are noncoplanar while a bottom surface of the first portion 4001 and a bottom surface of the second portion 5002 are coplanar to the top surface of the antireflective layer 170.

Figure 6:
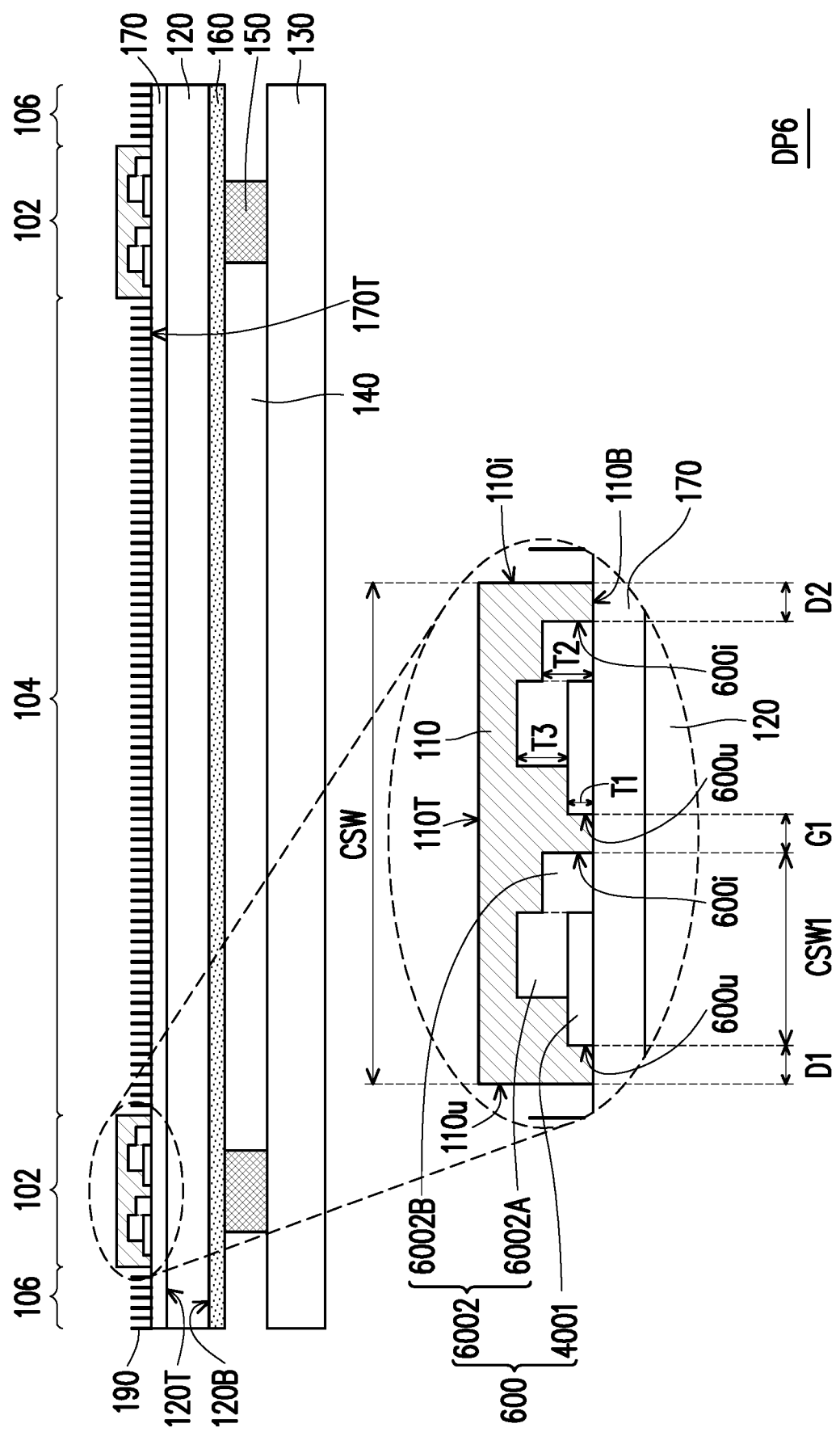

In some embodiments, at least one second portion may be further regionalized or divided into different sections. FIG. 6 is a schematic diagram illustrating a cross section of a display panel according to an embodiment of the invention. As shown in FIG. 6, in the display panel DP6, at least one of protrusions 600 includes a first portion 4001 and a second portion 6002. The second portion 6002 includes a first section 6002A and a second section 6002B. The first section 6002A is disposed on a top surface of the first portion 4001; the second section 6002B is disposed adjacent to an edge of the first portion 4001. Namely, the second section 6002B is disposed beside the first portion 4001. In the embodiment, the second portion 6002 is in contact with and partially overlaps merely one first portion 4001. In an alternative embodiment, the first portion may be overlapped by more than one second portion. In the embodiment, the top surface of the first portion 4001 and a top surface of the second section 6002B are noncoplanar. In an alternative embodiment, the top surface of the first portion 4001 may be coplanar with a top surface of the second section 6002B. In some embodiments, a first thickness T1 of the first portion 4001, a second thickness T2 of the first section 6002A or a third thickness T3 of the second section 6002B is in a range of 50 angstroms to 50 micrometers. In some embodiments, the second thickness T2 of the first section 6002A or the third thickness T3 of the second section 6002B is greater than the first thickness T1 of the first portion 4001. In some embodiments, a first cross section width of the first portion 4001 is in a range of 20 micrometers to 200 micrometers and the first section 6002A may partially or completely overlap the first portion 4001. It is worth noting that the contour of each protrusion 600 shown in FIG. 6 is similar to the contour of each protrusion 300 shown in FIG. 3; nevertheless, there is an interface inside each protrusion 600 to divide the first portion 4001 from the second portion 6002, in contrast to the protrusion 300, which is integrally formed into a single entity. Besides, the fabrication process of the protrusions 600 may be distinct from that of the protrusions 300.

Figure 7:
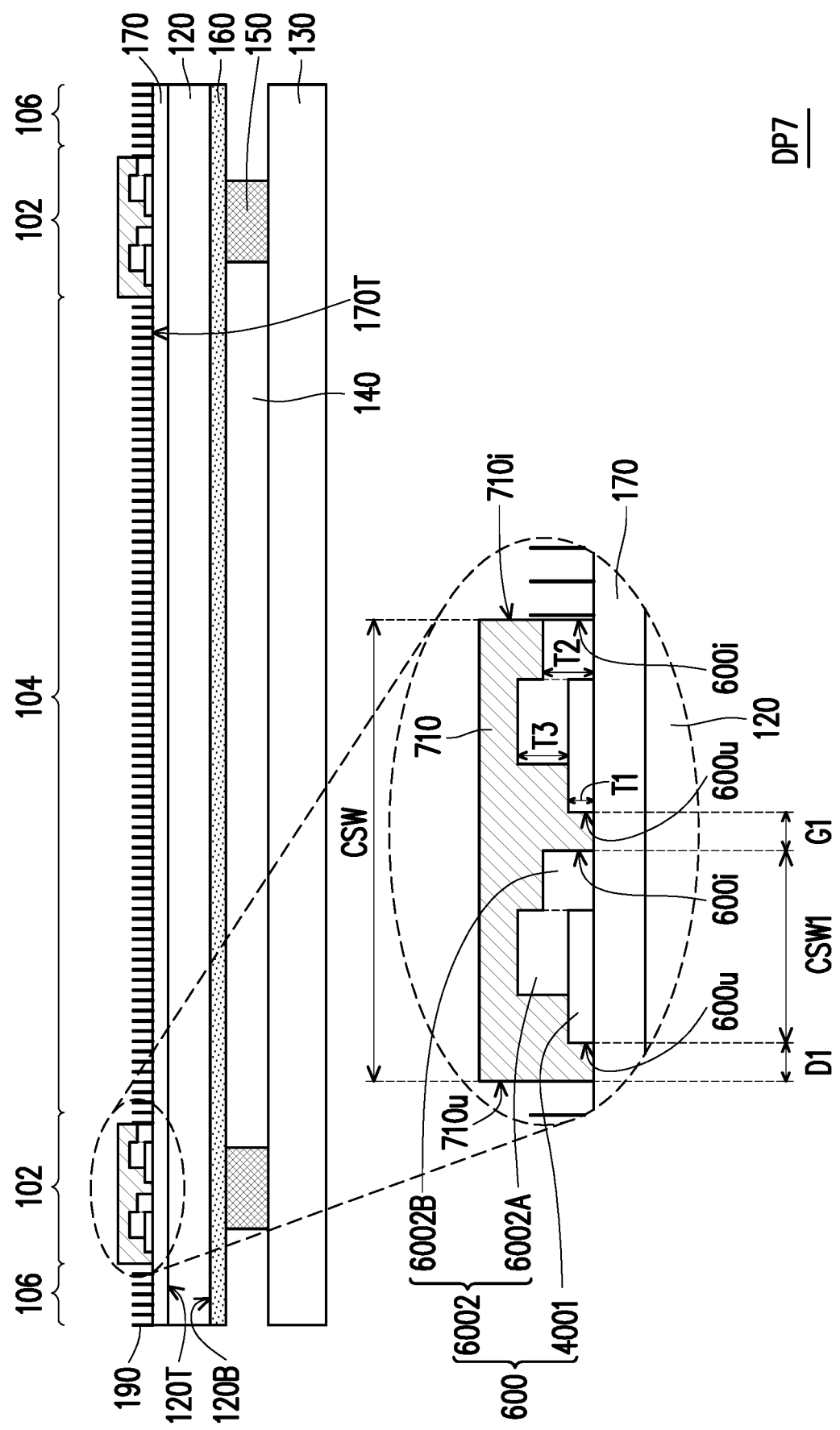
Figure 8:
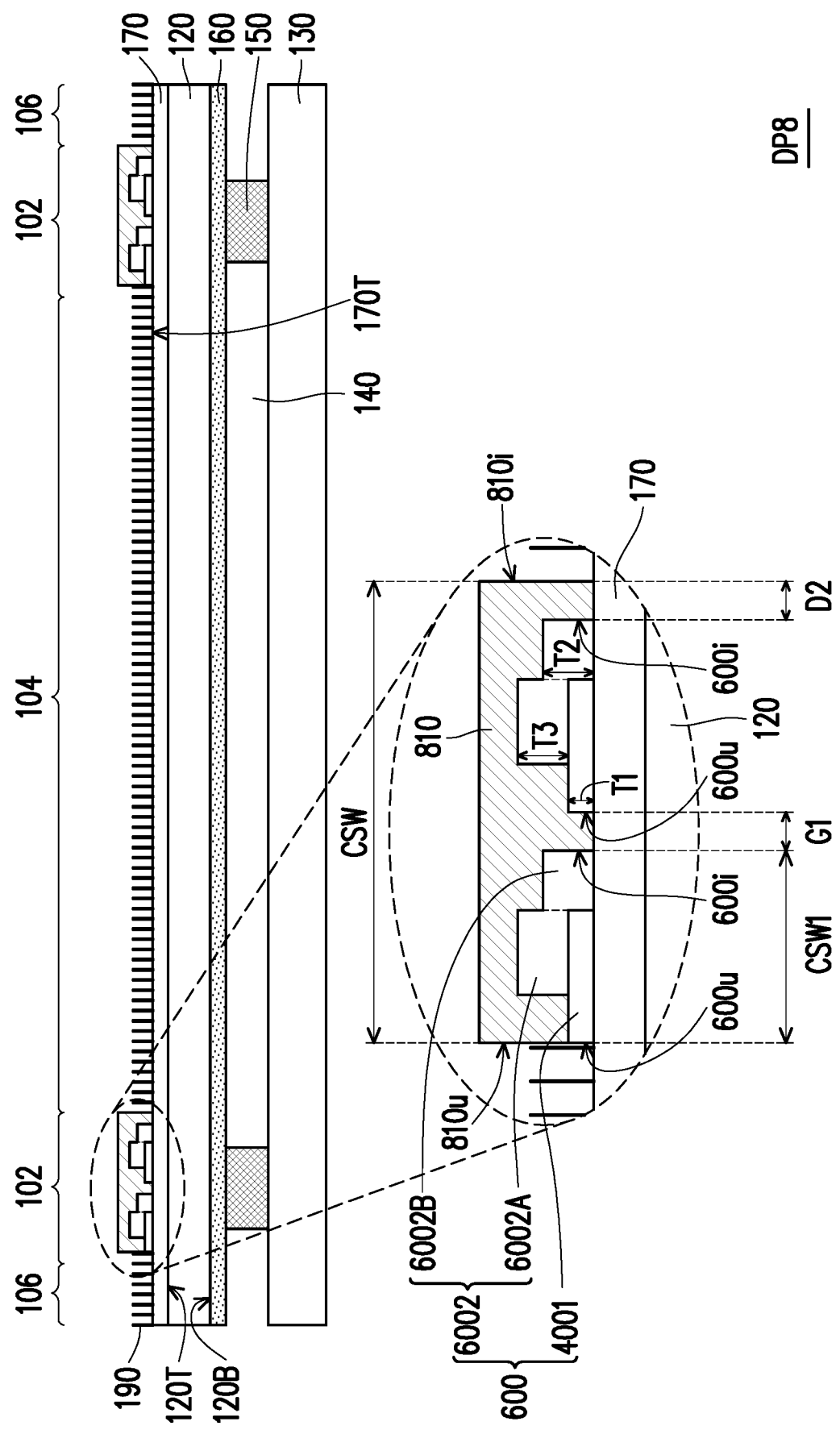
Figure 9:
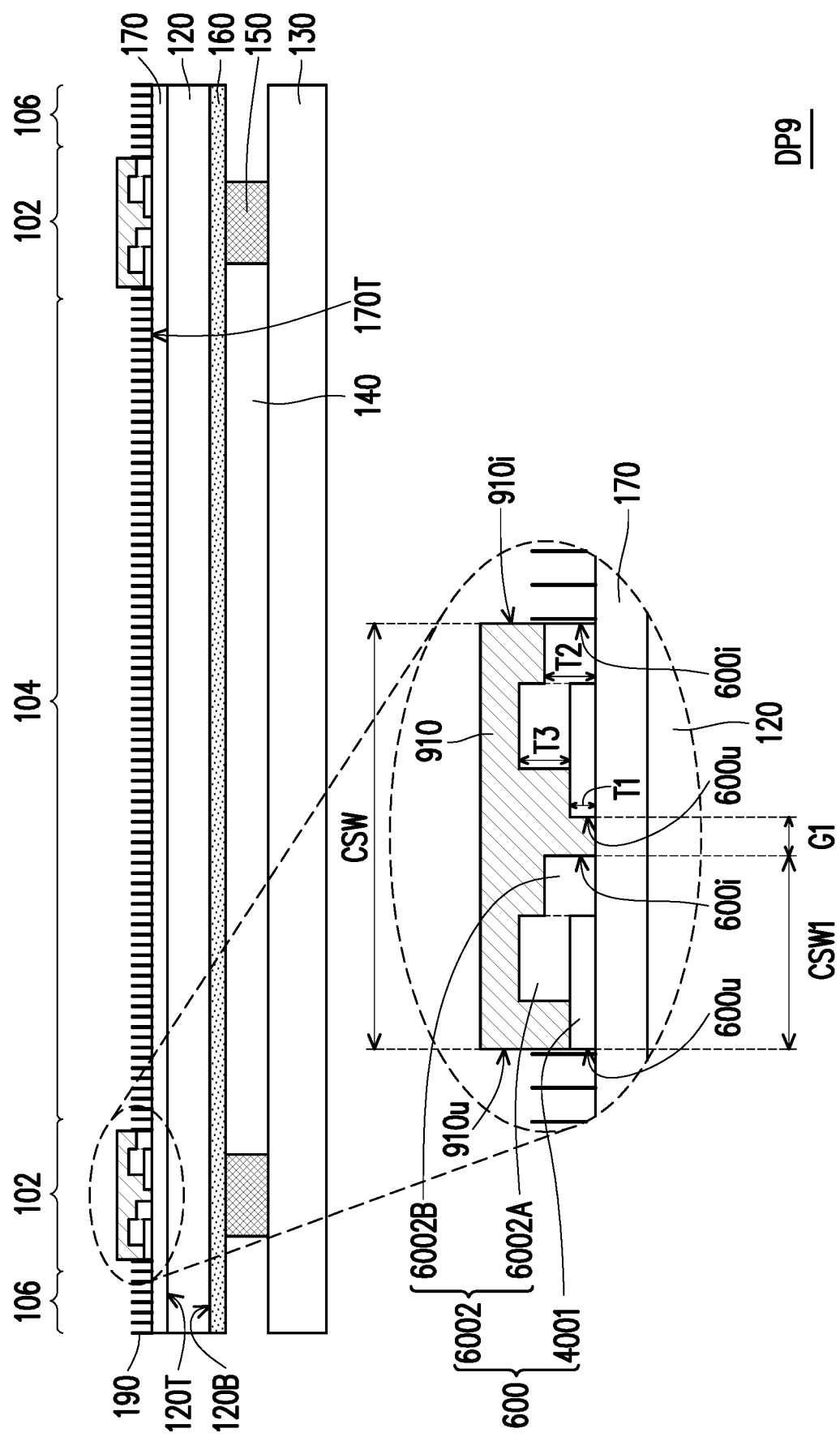

In FIG. 6, the edges of the protrusions 600 may be spaced apart from the edge of the light shielding layer 110. However, an edge of a protrusion and that of the light shielding layer 110 may be neatly aligned. FIGS. 7 to 9 are schematic diagrams illustrating cross sections of display panels according to embodiments of the invention. As shown in FIG. 7, in the display panel DP7, an outer edge 710*u* of a light shielding layer 710 and a (first outer) edge 600*u* of the (left) protrusion 600 closest to the outer edge 710*u* are spaced apart by the first distance D1, while an inner edge 710*i* of the light shielding layer 710 and a (second inner) edge 600*i* of the (right) protrusion 600 closest to the inner edge 710*i* may be aligned and a distance therebetween may be dropped to (near) zero. As shown in FIG. 8, in the display panel DP8, an inner edge 810*i* of a light shielding layer 810 and a (second inner) edge 600*i* of the (right) protrusion 600 closest to the inner edge 810*i* are spaced apart by the second distance D2, while an outer edge 810*u* of the light shielding layer 810 and a (first outer) edge 600u of the (left) protrusion 600 closest to the outer edge 810u may be aligned and a distance therebetween may be dropped to (near) zero. As shown in FIG. 9, in the display panel DP9, an outer edge 910u of a light shielding layer 910 is aligned with the (first outer) edge 600u of the (left) protrusion 600 closest to the outer edge 910u. An inner edge 910i of the light shielding layer 910 is aligned with the (second inner) edge 600i of the (right) protrusion 600 closest to the inner edge 910i.

Figure 10:
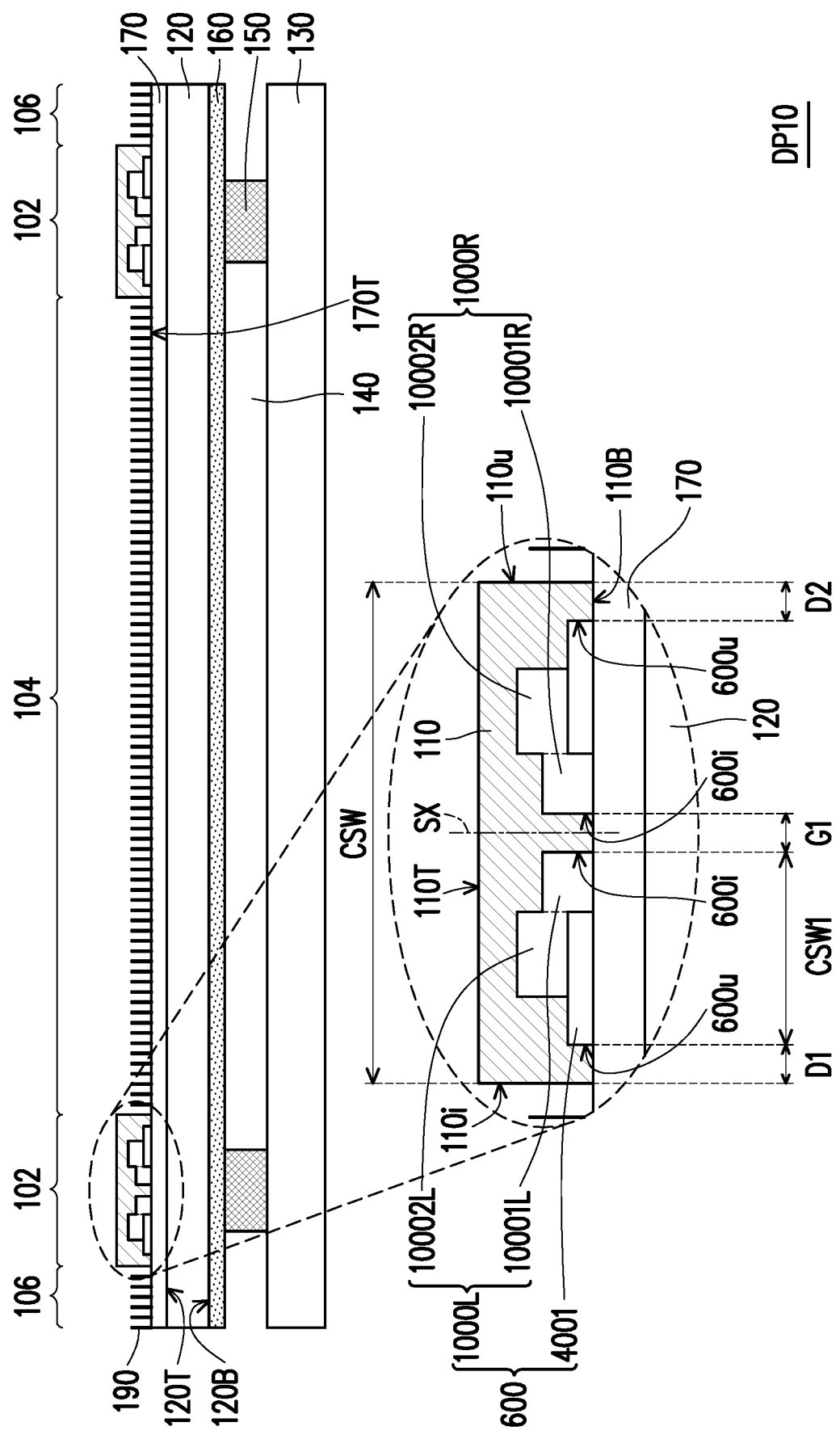
Figure 11:
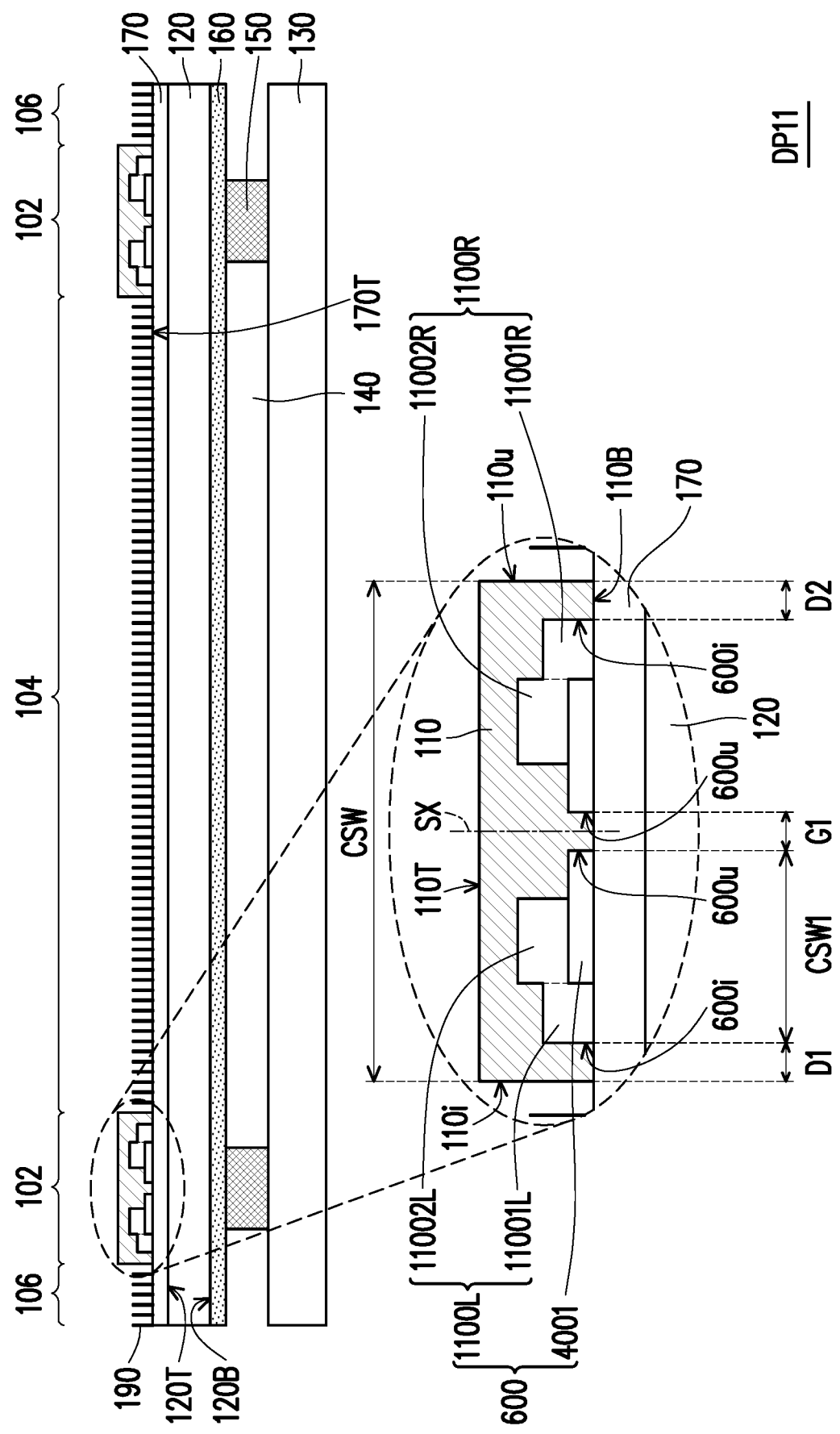

It is worth noting again that shapes or arrangements of protrusions in the present invention may be may be irregular even though the protrusions 100 or 200 shown in FIG. 1A or FIG. 2 are arranged in or constitute a constant or definite pattern. Specifically, the protrusions may be identical and arranged methodically in rows and columns in some embodiments. In some embodiments, a size of one of the protrusions is identical to a size of another one of the protrusions. In some embodiments with the protrusions similar to the protrusions 600 shown in FIG. 6, a size of at least one of the first sections and the second sections is identical to a size of another one of the first sections and the second sections. However, in other embodiments, the protrusions may not be exactly alike. Moreover, the protrusions may be randomly distributed. FIGS. 10 and 11 are schematic diagrams illustrating cross sections of display panels according to embodiments of the invention. As shown in FIG. 10, in the display panel DP10, a protrusion 1000L and a protrusion 1000R differs. The protrusion 1000L and the protrusion 1000R presents a mirror symmetry—that is to say, the protrusion 1000L and the protrusion 1000R on either side of an axis of symmetry SX look like mirror images of each other. The first portions 10001L and 10001R are located away from the axis of symmetry SX with the second portions 10002L and 10002R in between. As shown in FIG. 11, in the display panel DP11, a protrusion 1100L and a protrusion 1100R also presents a mirror symmetry, while second portions 11002L and 11002R are located away from the axis of symmetry SX the with the first portions 11001L and 11001R in between.

Figure 12:
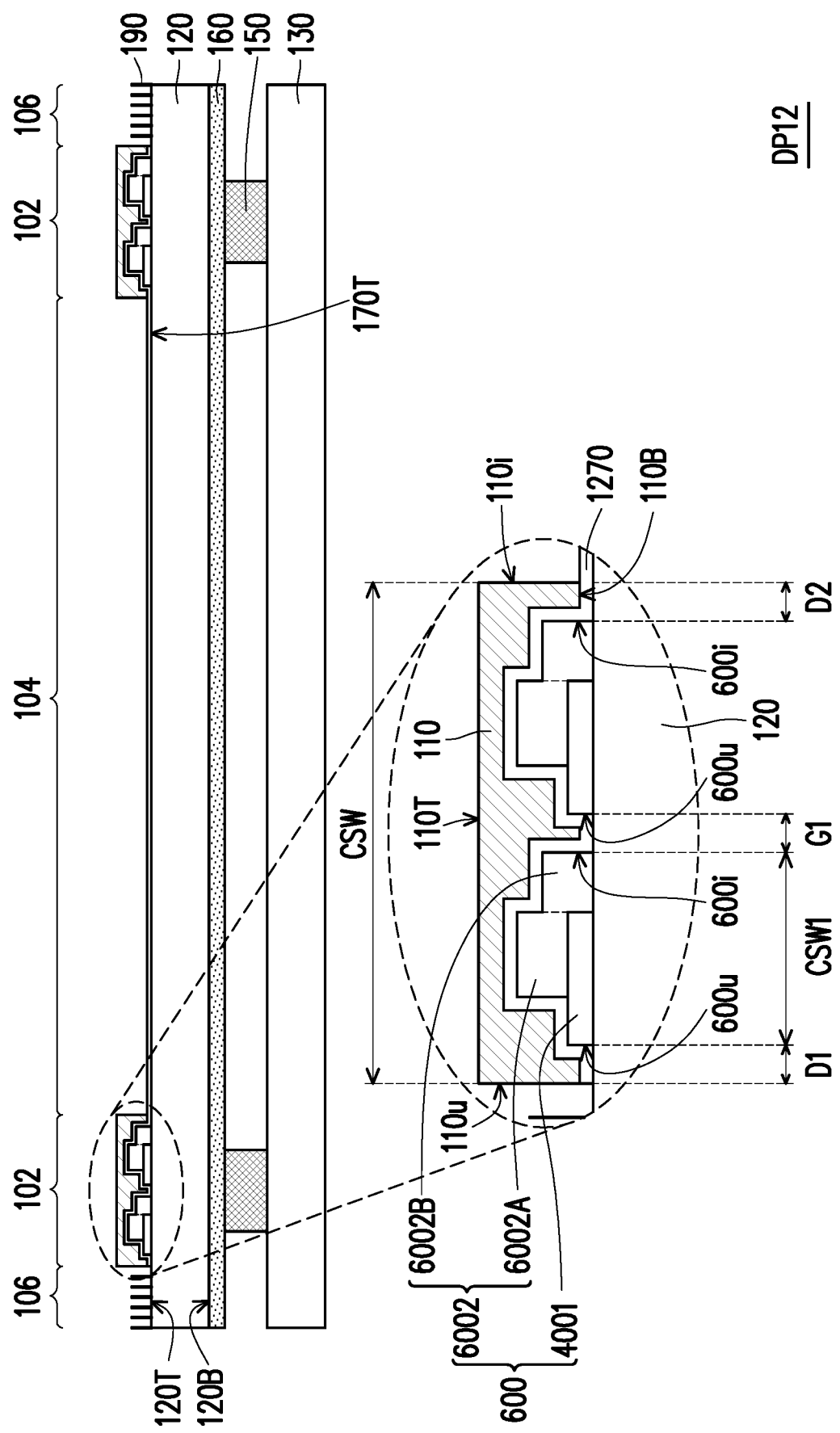

In FIG. 6, the antireflective layer 170 completely overlaps the entire top substrate 120 and is disposed directly on the top substrate 120. The hydrophobic layer 190 is located in the second region 104 and the third region 106. In some embodiments, the antireflective layer and the hydrophobic layer may be reconfigured. FIGS. 12 to 15 are schematic diagrams illustrating cross sections of display panels according to embodiments of the invention. As shown in FIG. 12, in the display panel DP12, an antireflective layer 1270 covers the protrusions 600 and is disposed underneath the light shielding layer 110 so that the antireflective layer 1270 is interposed between the light shielding layer 110 and the protrusions 600. In the embodiment, the thickness of the antireflective layer 1270 covering the protrusions 600 may be so thin that the top surface of the antireflective layer 1270 substantially conforms the profile of the protrusions 600. In other words, the bottom surface of the light shielding layer 110 covering the antireflective layer 1270 is nonplanar though the light shielding layer 110 only contacts the antireflective layer 1270. In addition, the stack relationship of the antireflective layer 1270, the light shielding layer 110 and the protrusions 600 may be applied to any of the above embodiments, for the antireflective layer interposing between the light shielding layer and the protrusions. Namely, the disclosure is not limited to the embodiments described herein, and each embodiment of the disclosure can be combined with the other embodiment(s) of the disclosure.

Figure 13:
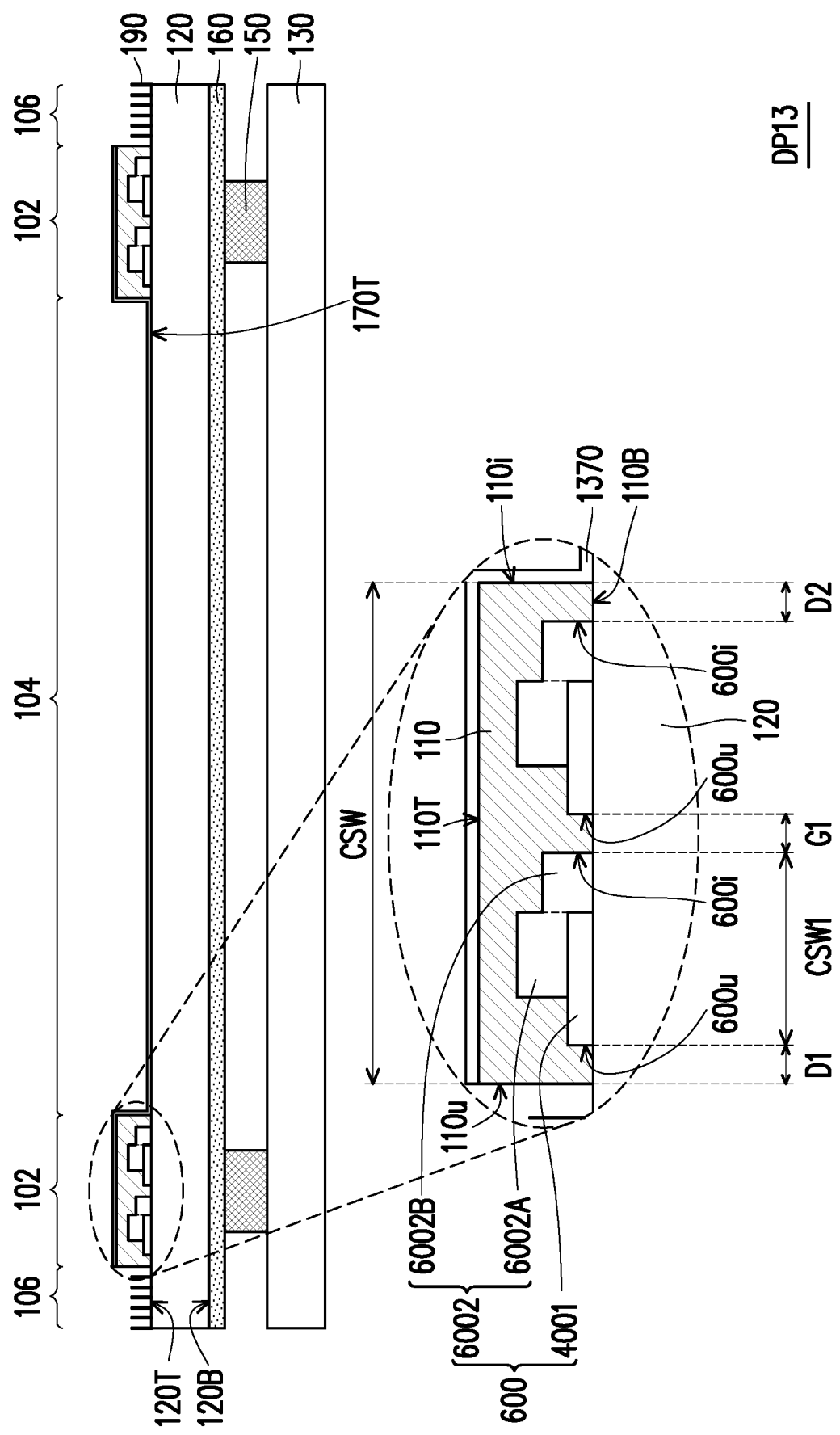

In some embodiments, in the display panel DP13, the light shielding layer 110 shown in FIG. 13 is overlaid with an antireflective layer 1370 which is located in the first region 102 and the second region 104. As such, the bottom surface of the light shielding layer 110 may not contact the antireflective layer 1370 and instead contact the top substrate 120. Furthermore, the light shielding layer 110 is interposed between the antireflective layer 1370 and the protrusions 600. In such a situation, the antireflective layer 1370 is nonplanar. As shown in FIG. 12 (or FIG. 13), the hydrophobic layer 190 may be absent in the second region 104 or may be completely absent. In addition, the stack relationship of the antireflective layer 1370, the light shielding layer 110 and the protrusions 600 may be applied to any of the above embodiments, for the antireflective layer interposing between the light shielding layer and the protrusions. Namely, the disclosure is not limited to the embodiments described herein, and each embodiment of the disclosure can be combined with the other embodiment(s) of the disclosure.

Figure 14:
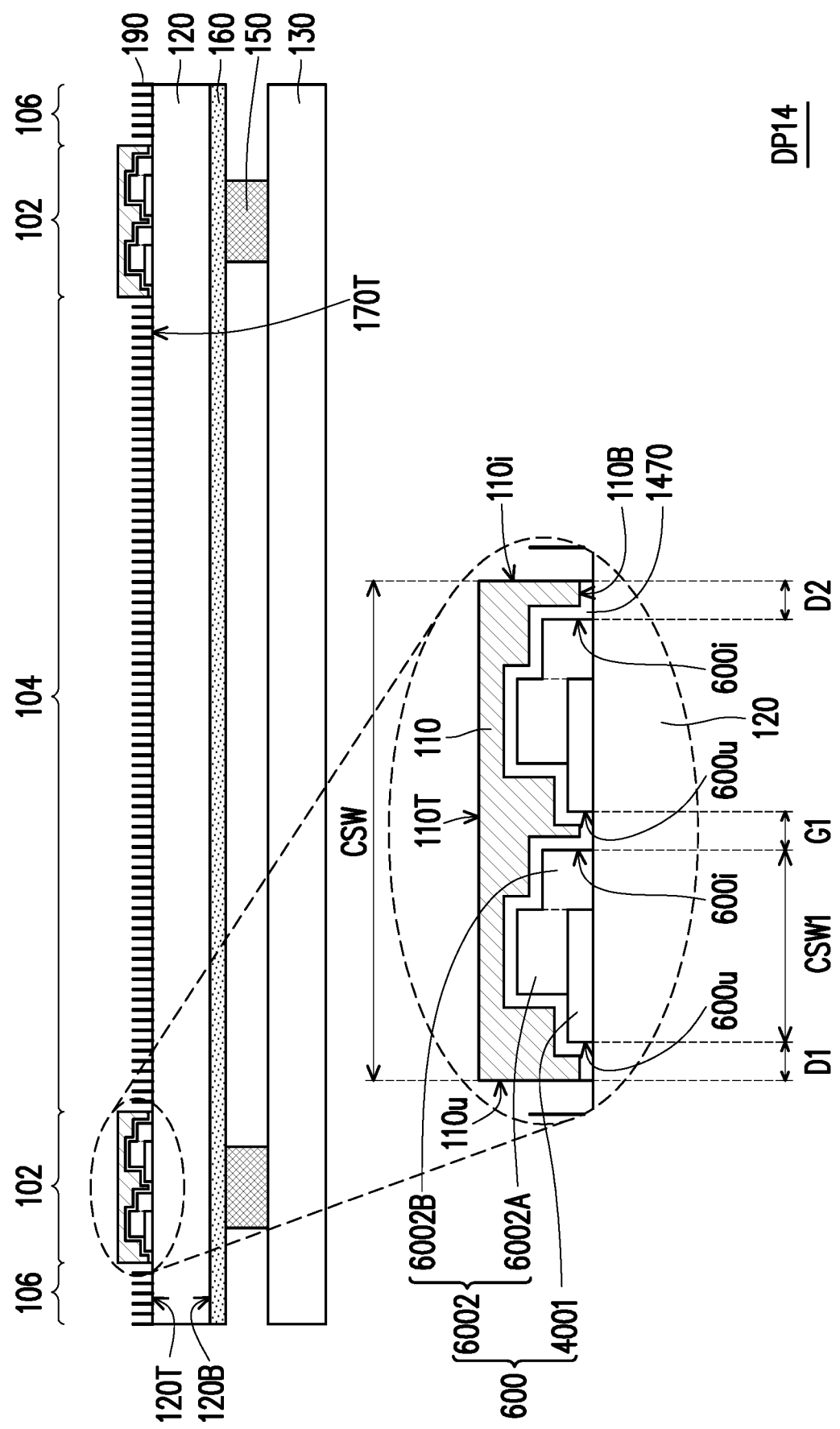

Similarly, as shown in FIG. 14, in the display panel DP14, an antireflective layer 1470 covers the protrusions 600 and is disposed underneath the light shielding layer 110 so that the antireflective layer 1470 is interposed between the light shielding layer 110 and the protrusions 600. In the embodiment, the thickness of the antireflective layer 1470 covering the light shielding layer 110 may also be thin to ensure that the top surface of the antireflective layer 1470 substantially conforms the profile of the protrusions 600. In other words, the bottom surface of the light shielding layer 110 covering the antireflective layer 1470 is nonplanar though the light shielding layer 110, and the light shielding layer 110 merely contacts the antireflective layer 1470. Different from the antireflective layer 1270 shown in FIG. 12, an edge of the light shielding layer 110 in FIG. 14 may be aligned with an edge of an antireflective layer 1470. Namely, a projection of the light shielding layer 110 onto the top substrate 120 completely overlaps a projection of the antireflective layer 1470. Besides, the antireflective layer 1470 is located merely in the first region 102. In addition, the hydrophobic layer 190 is located not only in the second region 104 but also in the first region 102. As set forth above, the stack relationship of the antireflective layer 1470, the light shielding layer 110 and the protrusions 600 may be applied to any of the above embodiments, for the antireflective layer interposing between the light shielding layer and the protrusions. Namely, the disclosure is not limited to the embodiments described herein, and each embodiment of the disclosure can be combined with the other embodiment(s) of the disclosure.

Figure 15:
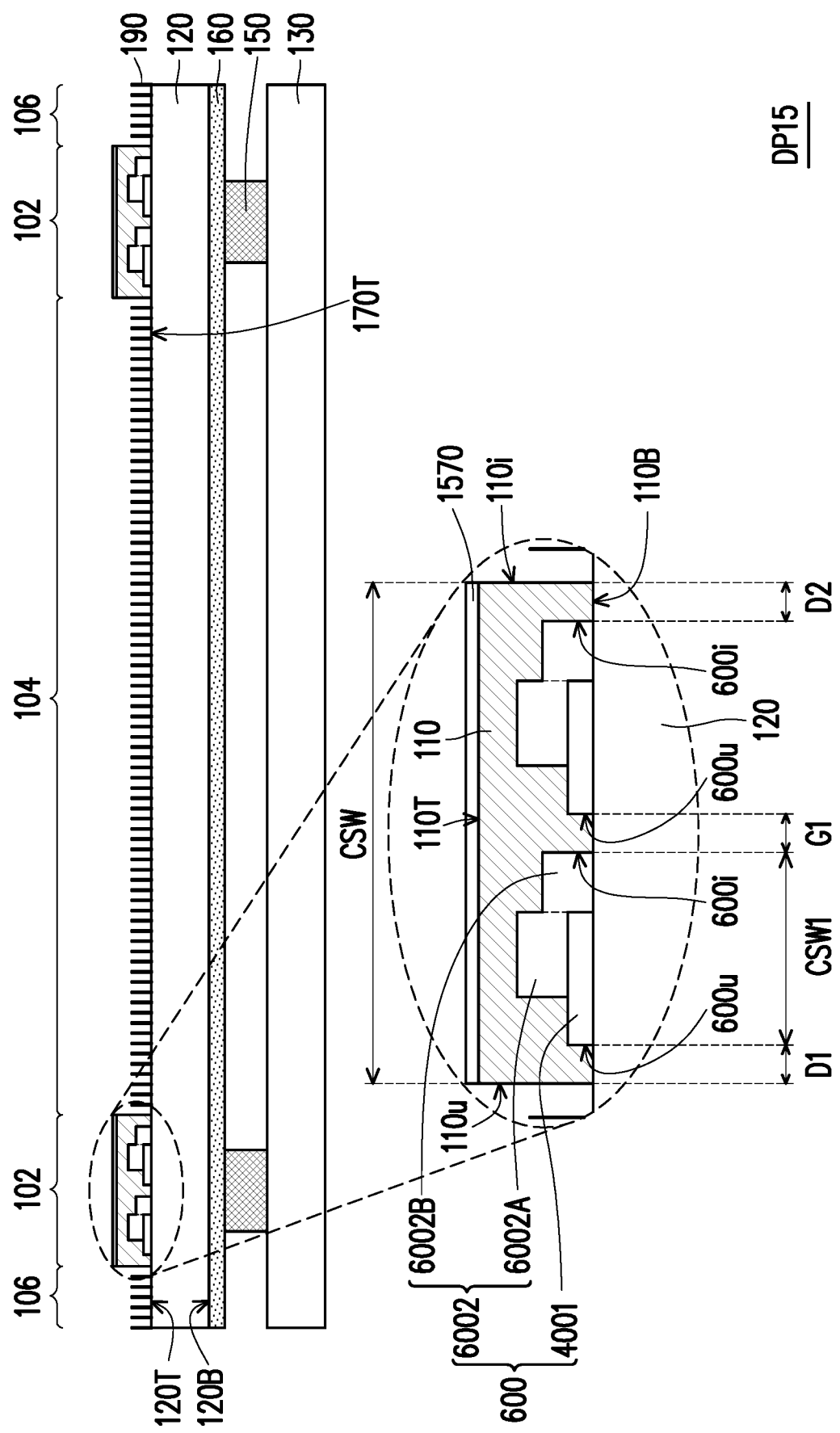

As shown in FIG. 15, in the display panel DP15, the light shielding layer 110 is overlaid with an antireflective layer 1570. As such, the bottom surface of the light shielding layer 110 may not contact the antireflective layer 1570 but contacts the top substrate 120 instead. Furthermore, the light shielding layer 110 is interposed between the antireflective layer 1570 and the protrusions 600. Different from the antireflective layer 1370 shown in FIG. 13, edge of the light shielding layer 110 may be aligned with an edge of an antireflective layer 1570. Namely, a projection of the light shielding layer 110 onto the top substrate 120 completely overlaps a projection of the antireflective layer 1570. Besides, the antireflective layer 1570 is located merely in the first region 102. In such a situation, the antireflective layer 1570 is smooth and flat. In addition, the hydrophobic layer 190 is located not only in the second region 104 but also in the peripheral region 106 of the first region 102. In addition, the stack relationship of the antireflective layer 1570, the light shielding layer 110 and the protrusions 600 may be applied to any of the above embodiments, for the antireflective layer interposing between the light shielding layer and the protrusions. Namely, the disclosure is not limited to the embodiments described herein, and each embodiment of the disclosure can be combined with the other embodiment(s) of the disclosure.

As set forth above, the display panel according to the embodiments of the disclosure is disposed with the protrusions in the first region where the light shielding layer is formed. The protrusions provide a rough surface to securely bond the light shielding layer and its underlying layer together. Accordingly, the adhesion between the light shielding layer and a top substrate of the display panel is enhanced. This ensures light shielding efficiency of the light shielding layer, thereby improving the quality of the display panel.

It will be apparent to those skilled in the art that various modifications and variations can be made to the disclosed embodiments without departing from the scope or spirit of the disclosure. In view of the foregoing, it is intended that the disclosure covers modifications and variations provided that they fall in the scope of the following claims and their equivalents.

What is claimed is:

1. A display panel comprising:
a top substrate having a top surface;
a plurality of protrusions disposed on the top surface of the top substrate;
an antireflective layer disposed on the top surface of the top substrate;
a light shielding layer, wherein a first projection of the light shielding layer onto the top substrate is completely located within a second projection of the antireflective layer onto the top substrate, and a bottom surface of the light shielding layer is nonplanar to cover the plurality of protrusions;
a bottom substrate positioned at a side of the top substrate opposite to the top surface of the top substrate; and
a display medium layer disposed between the top substrate and the bottom substrate.

2. The display panel according to claim 1, wherein the antireflective layer is continuously distributed at least underneath the light shielding layer.

3. The display panel according to claim 1, wherein at least one of the protrusions is stepped and has different levels, and the bottom surface of the light shielding layer extends along a top surface and a side surface of the at least one of the protrusions.

4. The display panel according to claim 1, wherein a distance between the bottom surface of the top substrate and a top surface of the antireflective layer is greater than or equal to a distance between the bottom surface of the top substrate and a bottom surface of each of the plurality of protrusions.

5. The display panel according to claim 1, wherein a third projection of one of the protrusions onto the top substrate is circular, elliptical, triangular, rectangular, polygonal, U-shaped, loop-shaped, closed and irregular in shape.

6. The display panel according to claim 1, wherein materials of the protrusions are identical to a material of the antireflective layer.

7. The display panel according to claim 1, wherein at least one of the protrusions is a stacked multi-layer thin film.

8. The display panel according to claim 1, wherein an outer edge of the light shielding layer and a first edge of one of the plurality of protrusions closest to the outer edge are spaced apart by a first distance, and an inner edge of the light shielding layer and a second edge of one of the protrusions closest to the inner edge are spaced apart by a second distance.

9. The display panel according to claim 1, wherein at least one of the plurality of protrusions comprises a first portion and a second portion, and the second portion is in contact with the first portion.

10. The display panel according to claim 9, wherein a material of the second portion is different from a material of the first portion.

11. The display panel according to claim 9, wherein the second portion is disposed on a top surface of the first portion to partially expose the first portion.

12. The display panel according to claim 9, wherein the second portion is disposed beside the first portion.

13. The display panel according to claim 12, wherein a top surface of the first portion and a top surface of the second portion are noncoplanar.

14. The display panel according to claim 9, wherein the second portion comprises a first section and a second section, the first section is disposed on a top surface of the first portion, and the second section is disposed beside the first portion.

15. The display panel according to claim 14, wherein the top surface of the first portion and a top surface of the second section are noncoplanar.

16. The display panel according to claim 14, wherein a first cross-section width of the first portion or a second cross-section width of the first section is in a range of 20 micrometers to 200 micrometers.

17. The display panel according to claim 14, wherein a first thickness of the first portion, a second thickness of the first section or a third thickness of the second section is in a range of 50 angstroms to 50 micrometers.

18. The display panel according to claim 1, wherein cross-section widths of the plurality of protrusions are greater than 10% of a cross-section width of the light shielding layer and less than 50% of the cross-section width of the light shielding layer.

19. The display panel according to claim 1, wherein thicknesses of the plurality of protrusions are less than 50% of a distance between a top surface of the light shielding layer and the bottom surface of the light shielding layer.

20. The display panel according to claim 1, further comprising a hydrophobic layer disposed on the top surface of the top substrate, wherein an outer edge of the light shielding layer is aligned with an inner edge of the hydrophobic layer.

* * * * *